(12) United States Patent
Nowak et al.

(10) Patent No.: US 8,303,682 B2
(45) Date of Patent: Nov. 6, 2012

(54) SUPPORT STRUCTURE FOR A FILTER BAG AND A METHOD OF USING THE SUPPORT STRUCTURE

(75) Inventors: Martin Nowak, Valby (DK); Ole Højgaard, Ribe (DK)

(73) Assignee: GEA Process Engineering A/S, Soborg (DK)

( * ) Notice: Subject to any disclaimer, the term of this patent is extended or adjusted under 35 U.S.C. 154(b) by 308 days.

(21) Appl. No.: 12/594,039

(22) PCT Filed: Mar. 30, 2007

(86) PCT No.: PCT/DK2007/050038
§ 371 (c)(1),
(2), (4) Date: Dec. 23, 2009

(87) PCT Pub. No.: WO2008/119345
PCT Pub. Date: Oct. 9, 2008

(65) Prior Publication Data
US 2010/0083835 A1    Apr. 8, 2010

(51) Int. Cl.
*B01D 46/02* (2006.01)
(52) U.S. Cl. .............. 95/1; 95/279; 95/281; 96/233; 55/302; 55/379
(58) Field of Classification Search ...... 55/341.1–341.7, 55/361–382; 210/172.4, 391–395, 407–412, 210/422, 424–427, 430; 96/227–233; 95/278, 95/281
See application file for complete search history.

(56) References Cited

U.S. PATENT DOCUMENTS

| | | | | |
|---|---|---|---|---|
| 4,058,379 A * | 11/1977 | Cheng | ............................. | 55/302 |
| 4,280,826 A | 7/1981 | Johnson, Jr. | | |
| 4,284,500 A * | 8/1981 | Keck | ............................. | 209/250 |
| 4,652,369 A * | 3/1987 | DePolo et al. | ............ | 210/167.13 |
| 5,139,686 A * | 8/1992 | Cares | ............................. | 210/797 |
| 5,800,580 A * | 9/1998 | Feldt | ............................. | 55/378 |
| 7,338,607 B2 * | 3/2008 | Dreyer et al. | ................. | 210/767 |
| 7,445,716 B2 * | 11/2008 | Quintel et al. | ................ | 210/636 |
| 7,468,082 B2 * | 12/2008 | Gordon | ........................... | 55/302 |
| 2011/0258976 A1 * | 10/2011 | Krueger | ........................ | 55/374 |

FOREIGN PATENT DOCUMENTS

| | | |
|---|---|---|
| DE | 11 41 980 B | 1/1963 |
| DE | 30 01 604 A1 | 7/1981 |
| DE | 34 21 856 C1 | 7/1985 |
| EP | 0 077 086 A2 | 4/1983 |
| EP | 0 572 356 A1 | 12/1993 |
| JP | 07-204434 A | 8/1995 |
| WO | 91/06359 A1 | 5/1991 |

* cited by examiner

*Primary Examiner* — Duane Smith
*Assistant Examiner* — Thomas McKenzie
(74) *Attorney, Agent, or Firm* — Sughrue Mion, PLLC

(57) ABSTRACT

The support structure is used in a filter bag for filtering gas and has a plurality of tubular pipe elements extending in the longitudinal direction of the filter bag. The tubular pipe elements are connected to annular elements located at a distance from each other in the longitudinal direction. The annular elements include elements formed by a number of parts, each part having two ends and extending between adjacent longitudinally extending tubular pipe elements.

24 Claims, 4 Drawing Sheets

SUPPORT STRUCTURE FOR A FILTER BAG AND A METHOD OF USING THE SUPPORT STRUCTURE

CROSS REFERENCE TO RELATED APPLICATIONS

This application is a National Stage of International Application No. PCT/DK2007/050038 filed Mar. 30, 2007, the contents of all of which are incorporated herein by reference in their entirety.

FIELD OF THE INVENTION

The present invention relates to a support structure for a filter bag for filtering gas. In particular, the invention relates to support structures for filter bags suitable for cleaning-in-place processes (CIP). Furthermore, the invention relates to a method of using the support structure, in particular for controlling, cleaning and/or inspecting the filter bag by means of the support structure.

BACKGROUND OF THE INVENTION

The support structure and the filter bag may form part of a bag filter in a filter unit or of a filter integrated in process equipment such as e.g. spray dryers and fluid bed processing equipment. Such bag filters are well known in the prior art and are adapted to separate particulate matter from a gas. One example of use of the bag filter integrated in the process equipment is shown in U.S. Pat. No. 6,463,675 (Assignee: Niro A/S). Bag filters forming part of a filter unit are disclosed in, i.a., U.S. Pat. Nos. 6,676,720, 6,149,716 and 6,332,902 (Assignee of all patents: Niro A/S).

The filter bags may be of any material suitable to the purpose, and may for instance be made of felt or woven of e.g. polyester or Teflon® (PTFE). A felt or polyester material may be permeable to the cleaning fluid, while Teflon® is not. Alternatively, a filter bag may be manufactured from a permeable material and subsequently coated with an impermeable material, e.g. a polyester material coated with Teflon®. In general, the material used in such filter bags is flexible.

Traditionally, such a filter bag is, on its inside, supported by a support structure in the form of a basket to prevent the flexible bag to collapse due to the process gas flow from the outside to the inside of the bag. Such a support structure traditionally includes a number of threads or rods extending in the longitudinal direction of the filter bag and spaced from each other, seen in the circumferential direction, in suitable intervals. The longitudinally extending rods are held by a number of rings or annular rods that are spaced from each other, seen in the longitudinal direction, in suitable intervals. Most often, the filter bag is positioned with the longitudinal direction extending substantially vertically in the mounted position, e.g. when the top of the filter bag is mounted in the filter unit or in the process equipment. Hence, in such a position the longitudinally extending rods are substantially vertical and the annular rods are substantially horizontal.

In between periods of operation the filter unit is cleaned, e.g. by a cleaning-in-place process (CIP) involving cleaning nozzles located at least in the clean gas chamber at the upper outlet side of the bag filters. The cleaning nozzles are supplied with a cleaning fluid that possibly includes a cleaning agent. It is also possible to supply the cleaning nozzles with gas pulses in combination with the supply of cleaning fluid. During cleaning the cleaning fluid is washed down into the bag filters together with any entrained particles or powder from the clean gas side. Similarly, the bag filters are cleaned on the outside.

A great demand on the quality of the CIP exists. In the chemical industry, e.g. for dyes, it is essential to avoid cross-contamination when shifting from one colour to another. In the dairy and food industry, the quality of the cleaning is very important for bacteriological reasons. Furthermore, the cleaning quality is essential in the pharmaceutical industry, again for bacteriological and health reasons and to meet requirements of authority regulations.

In the pharmaceutical industry, the active components may not escape from the process equipment and therefore, impermeable filter bags may be prescribed for this area of application. In a CIP process, the filter bags are usually cleaned from the outside, i.e. the product side, and from the inside, i.e. the clean gas side. In order to drain off the cleaning fluid from inside the filter, a controlled valve may be provided in the bottom of the filter, in particular in the case when the bottom is impermeable. A prior art valve of this kind is e.g. disclosed in U.S. Pat. No. 5,444,892 (Assignee: Niro-Aeromatic AG).

Particularly within this field of application, but also in other fields, there is a need for inspecting and controlling the operative position of the valve from the outside of the filter unit or processing equipment in order to detect whether the valve is open or closed, and to activate and de-activate the valve.

Also for cleaning considerations, it is vital that there are as few items as possible connected to the filter. Furthermore, the items must be easily cleanable. In addition to the fact that the prior art support structure may suffer from some disadvantages with respect to sufficient cleaning due to the configuration of the rods, the filter bag material is exposed to wear. This is due to the fact that the filter bag material is mounted such that it abuts on the support structure, i.e. on the longitudinally extending rods and the annular rods. During operation, process gas is blown through the filter bag, thereby forcing the filter bag material against the support structure. Furthermore, the filter bag is subjected to pressure pulses ejected from a suitable supply to shake off product adhering to the outside of the filter bag, at intervals during filtration. Consequently, the filter bag material is exposed alternately to circumferential tensile stress and to local tension at the lines of contact between the filter bag material and the rods.

SUMMARY OF THE INVENTION

With this background it is an object of the invention to provide a support structure of the kind mentioned in the introduction, which provides for facilitated and improved cleaning of the entire bag filter in order to fulfil sanitary requirements, and which makes it possible to reduce the wear and tear on the filter bag to be supported by the support structure.

This and further objects are obtained by a support structure for a filter bag for filtering gas, the filter bag having a general longitudinal direction and including a filter material adapted to be arranged on the outer side of said support structure, said support structure comprising a plurality of elements extending in said longitudinal direction from a first end to a second end, and a plurality of substantially annular elements, each annular element being located in a transverse plane perpendicular to the longitudinal direction and connected to the plurality of longitudinally extending elements, and said annular elements being located at a distance from each other in the longitudinal direction, said support structure being characterized in that a at least said plurality of longitudinally extending elements includes tubular pipe elements.

By providing the support structure with one or more tubular pipe elements instead of the rods utilized in the prior art structures, a number of advantages are achieved: Firstly, the cavities in the tubular pipe elements may be utilized to accommodate control means and to introduce cleaning fluid etc. into the filter bag in a very simple manner. Secondly, a more lightweight structure may be obtained, as pipe elements have greater strength than rods, giving basis for a reduced number of elements compared to the number of rods. This also leads to a reduced number of weldings between elements which is a manufacturing advantage. Thirdly, in the case that the tubular pipe element has a larger diameter than a comparable rod of the prior art, the larger curvature of such a tubular pipe element reduces the wear and tear on the filter bag, as the area of contact between the support structure and the filter bag is increased, thus reducing the tension.

In principle, only a limited number of the longitudinally extending elements needs be tubular in order to fulfil the function of utilizing the tubular pipe elements for control, inspection and/or cleaning purposes. However, in one embodiment each longitudinally extending element is a tubular pipe element. This provides for, i.a., a more standardized manufacture.

The annular elements positioned transversely to the longitudinal direction may be formed as circular rings, as in the prior art, or said plurality of substantially annular elements may include elements formed by a number of parts, each part having two ends and extending between adjacent longitudinally extending elements, and each end being connected to a respective longitudinally extending element. By forming the annular elements as a number of parts the support structure may be made to custom, as the position and shape of the parts may be varied, e.g. along the longitudinal direction of the support structure.

In one further development of this embodiment, the general shape of the support structure is cylindrical. The parts of the annular elements may either be convex, e.g. part circular, seen in the longitudinal direction, or straight, i.e. follow a straight line between the tubular pipe elements.

In a preferred development of this embodiment, each of said parts is concave, seen in the longitudinal direction, and the general shape of the support structure is cylindrical with longitudinally extending concavities. The concavities entail that the material of the filter bag is subjected to lower tension when process gas is blown through the filter bag in comparison with support structures having a cross-sectionally plane or convex shape between the longitudinally extending tubular pipe elements. This is due to the fact that the material of the filter bag is flexible and adapts to the support structure, i.e. the material will abut on the parts of the support structure, which protrude in the radial direction. As the parts of the annular elements of the support structure are positioned substantially along the shape of the filter bag material when the filter bag is blown through by process gas, an almost unobtrusive support of the filter bag material occurs. The circumference may be kept the same as in a support structure having ring-shaped annular elements by forming the parts as inverted circular parts. In this manner, optimum support of and minimized wear on the filter bag is achieved.

The number of longitudinally extending elements may vary according to the transverse dimension of the support structure and of other factors. Advantageously, said plurality of longitudinally extending elements includes 4-10 elements, preferably 6-8 elements.

In a further embodiment, said plurality of substantially annular elements includes tubular pipe elements. This makes it possible to utilize the cavities of these elements as well.

In case the filter bag for use with the support structure is formed by a material that is impermeable to cleaning fluid, at least at the bottom of the filter bag, the structure may be formed to comprise a connecting device adapted to receive a valve, said connecting device being located at the second end of the support structure. By providing the connecting device on the support structure itself, the filter bag may be formed simpler, as there is no need for a connection between the filter bag and such a valve.

In order to facilitate control and inspect the valve through the support structure, said connecting device may be connected to at least one of said longitudinally extending tubular pipe elements.

In one development of this embodiment, said valve is adapted to be activated and/or de-activated by control means in said longitudinally extending tubular pipe elements. The need for control means positioned externally on the support structure is thus rendered superfluous.

In a further development of this embodiment, said control means includes a pressurized fluid. Alternatively, said control means includes electrical wiring or optical fibres. Also a wire connection may be used, though less relevant for sanitary designs.

Preferably, at least one of said longitudinally extending elements has a communication port at the second end of the support structure or has several ports along its extension. The communication port or ports may be adapted to supply a cleaning liquid, a cleaning gas and/or a drying gas to the interior of the filter bag.

In order to improve the operability of the support structure even further said communication port may include means for measuring and/or sensing, e.g. for sensing the operative position of the valve.

In a structurally simple embodiment, the structure comprises an annular top element at said first end, the top element being connected to said plurality of longitudinally extending tubular pipe elements, and wherein the top element is adapted to be connected to a suspension plate by means of a fastening device. The annular top element at the top has the two-fold function of improving the strength of the support structure and forming part of the connection to the remaining portion of the filter unit, whether in a separate unit or integrated into processing equipment.

Preferably, said annular top element comprises one or more recesses forming drain holes in the side intended to face the suspension plate.

In an embodiment, which provides for facilitated cleaning and hygiene, said fastening device comprises a handle having a keyhole-shaped recess adapted to be connected to a cross-sectionally rectangular pin adapted to be mounted on said suspension plate, said handle being furthermore adapted to be turned with respect to said rectangular pin to obtain a locked position, in which the support structure is connected to said suspension plate. The use of more complicated fastening devices making use of e.g. threaded pins and bushings is thus avoided.

A further aspect of the invention provides for a bag filter comprising a filter bag and a support structure according to any one of the preceding claims.

In a still further aspect, a method of using the support structure is provided. The method includes providing a support structure with one or more tubular pipe elements, connecting one or more of the tubular pipe elements with a connecting device at the second end of the support structure, connecting the connecting device with a valve, and providing at least one of said tubular pipe elements with control means, and controlling said valve through said control means.

DETAILED DESCRIPTION OF THE INVENTION AND OF PREFERRED EMBODIMENTS

Figures 1, 2:
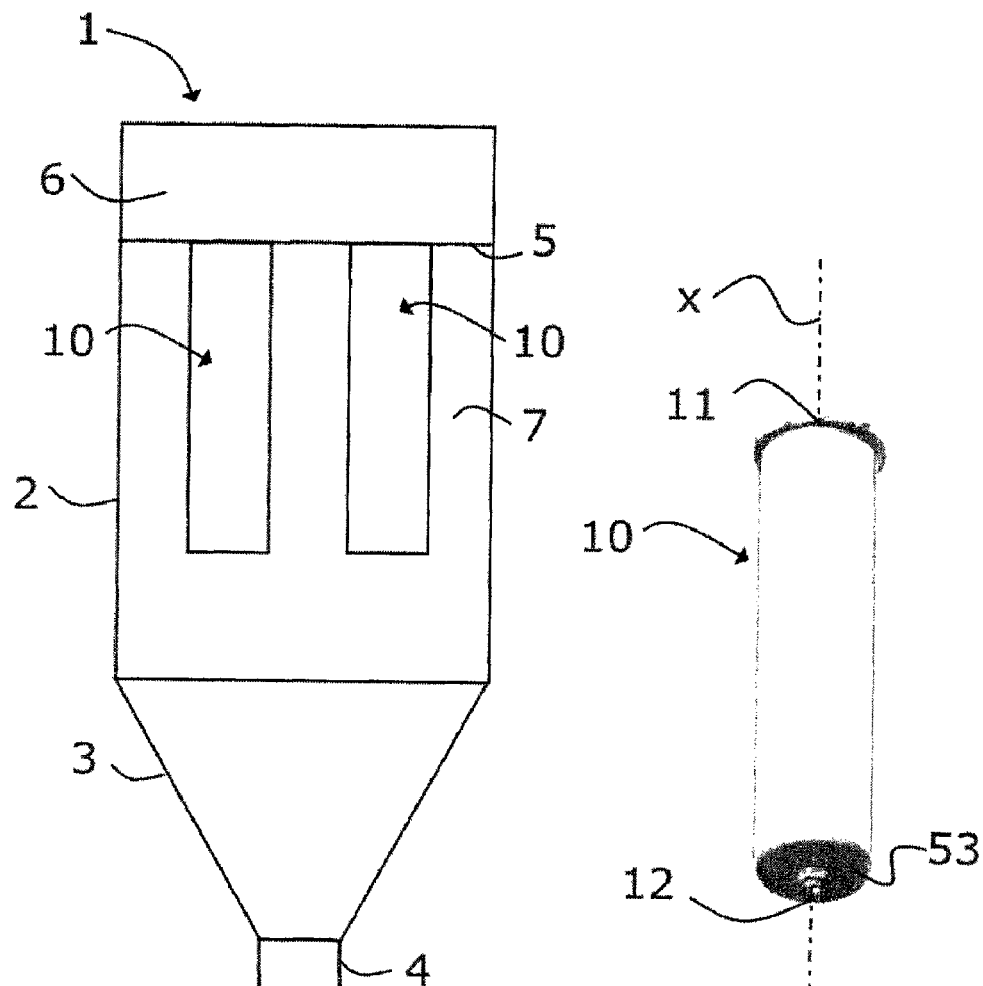
FIG. 1 shows a schematic side view of a filter unit including two bag filters.
FIG. 2 is a perspective view, on a larger scale, of a bag filter including a filter bag and a support structure.

FIG. 1 illustrates a filter unit 1 employed for separating product particles from a process gas coming from e.g. a spray drying apparatus, a fluid bed apparatus, a drying apparatus, an agglomeration apparatus or the like using air or a gas in the treatment of particulate or dust-like products, or from other industrial processes, such as flue gas cleaning. The products can be e.g. foodstuffs, dairies, pharmaceuticals, dyestuffs, chemical products etc. The process gas can be e.g. heated air or drying gas or special gas compositions inert to the products treated in the apparatus. In the embodiment of FIG. 1, the filter unit is shown as a separate external unit connected to a gas outlet for particle loaded processing gas in a plant (not shown). Alternatively, the filter unit can be integrated into a processing unit producing the particle loaded gas, such as a spray drying apparatus or a fluid bed apparatus. In the following description, the terms "filter", "bag filter", "filter bags" etc. denote equal or analogous elements forming part of either such a separate unit or an integrated unit.

A filter unit housing is composed of a vertically arranged cylindrical upper section 2 connected with a downward tapered lower section 3. An inlet (not shown) for process gas with product to be filtered off is arranged in the lower part of the cylindrical section 2 and an outlet (not shown) for filtered clean gas is arranged in the upper part of cylindrical section 2. At the bottom of the lower section 3, an outlet port 4 is arranged for extraction of retained product.

A horizontal suspension plate 5 is arranged in the upper part of the cylindrical section 2 and divides the housing in an upper outlet side with a clean-gas chamber 6 and a lower inlet side 7. The plate 5 has a number of holes, in which elongated tubular bag filters 10 are suspended approximately vertically with upwards-open ends that deliver filtered gas to the clean-gas chamber 6. Each bag filter 10 extends between a first end 11 and a second end 12 in a generally longitudinal direction indicated by axis x. The bag filters 10 are inserted into apertures (not shown) in the suspension plate 5 and the first end 11 of each filter is connected with the suspension plate 5 in a manner to be described in further detail below. The number of bag filters in the filter unit depends on the desired filter capacity. The smallest filter has a single filter element. Plants for treating, handling or producing pharmaceuticals can use smaller filter units having e.g. from 2 to 25 bag filters, and plants for foodstuffs, dairies and chemicals can comprise many hundreds of bag filters. For all of the above-mentioned applications, the bag filters may be located either in a separate filter unit or integrated in the plant.

As will be described in further detail below, each bag filter 10 comprises a filter bag and a support structure. The support structure is located on the inside of the filter bag and supports the filter bag, particularly in the radial direction.

Figure 3:
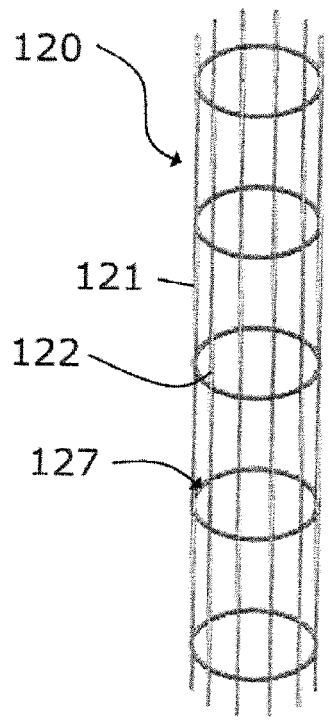
FIG. 3 is a perspective view, on a still larger scale, of a prior art support structure.
Figure 5:
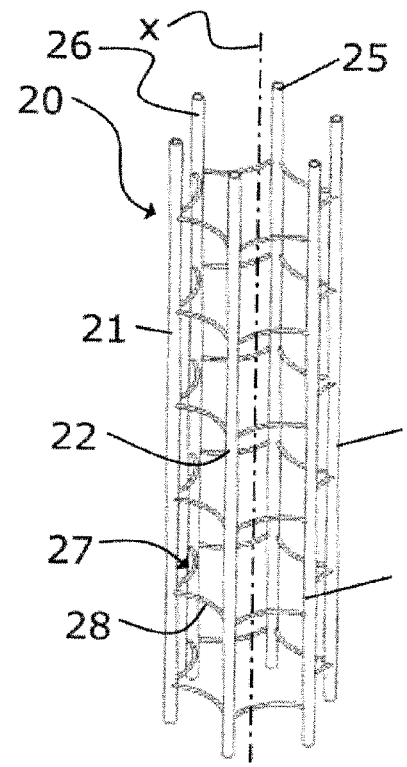
FIG. 5 is a partial perspective view corresponding to FIG. 3 of a support structure in one embodiment of the invention.
Figure 4:
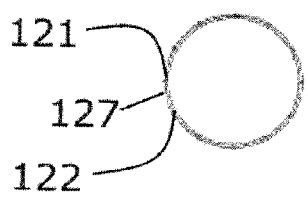
FIG. 4 is an end view of the prior art support structure of FIG. 4.

A prior art support structure 120 is shown in FIGS. 3 and 4. This support structure 120 has the form of a thread basket made of threads or rods 121, 122 extending in the longitudinal direction of the bag filter and being attached to rings or annular rods 127 of thread. Such thread baskets are well known in the art and comprise at least three longitudinal rods and at least two annular rods, but typically more than five rods and typically at least four annular rods per meter of length of the bag filter. Traditionally, the filter bag has at its lower end an end closure of either a permeable filter material or an impermeable, either flexible material or a rigid and strong material, such as steel, stainless steel or another metal, polymers or ceramics. The support structure can be made in several sections mounted in extension of each other. The top end of the support structure is suspended in the hole in the suspension plate 5 by means of an upper collar of a larger diameter than the hole and being placed on the upper side of plate 5.

FIGS. 5 to 10 show an embodiment of the support structure according to the invention. It is noted that the view of FIG. 5 indicates the general configuration of some elements forming part of this support structure. As in the prior art support structure shown in FIGS. 3 and 4, the support structure 20 of the embodiment shown in FIGS. 5-10 comprises a plurality of elements extending in the longitudinal direction x from a first end to a second end, and a plurality of substantially annular elements.

However, instead of being formed as solid rods, the longitudinally extending elements of this embodiment include six tubular pipe elements 21-26. There may be fewer or more than six elements, and not all the longitudinally extending element need be formed as tubular pipe elements.

As in the prior art support structure, each annular element 27 is located in a transverse plane perpendicular to the longitudinal direction x, and the annular elements 27 are located at a distance from each other in the longitudinal direction. Each annular element 27 is connected to the tubular pipe elements 21-26, however, each annular element 27 includes a number of parts 28, each part having two ends and extending between adjacent tubular pipe elements. For instance, the indicated part 28 extends between tubular pipe elements 21 and 22, each end of part 28 being connected to a respective tubular pipe element 21 and 22, respectively.

Figure 6:
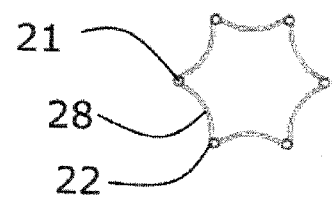
FIG. 6 is an end view of the support structure of FIG. 5.

In the embodiment shown, the general shape of the support structure is cylindrical. It is noted that the term "cylindrical" describes the general shape of the support structure. Hence, in the embodiment shown, the outer shape is defined by the six longitudinally extending tubular pipe elements 21-26. Other general shapes are conceivable as well, for instance shapes having an oval, polygonal, or a rectangular, e.g. square, cross-section. Referring now in particular to FIG. 6, it may be seen that each part 28 of the annular element 27 is concave, seen in the longitudinal direction, and the general shape of the support structure 20 is thus cylindrical with longitudinally extending concavities.

The parts 28 are shown as solid elements having any suitable cross-section. In order to prevent material filtered through the filter bag material from collecting on top of the parts 28, the upper side of each part 28 is preferably made with a rounded or otherwise sloping shape. Alternatively, the substantially annular elements 27 may include tubular pipe elements as well.

Figure 7:
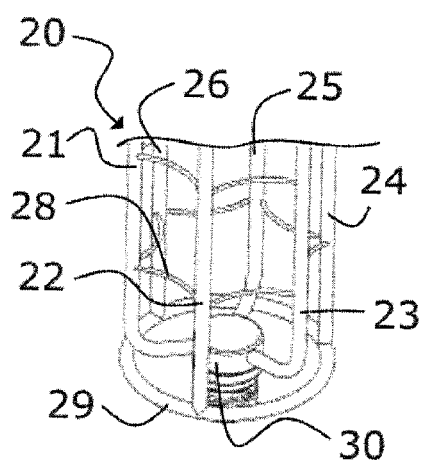
FIG. 7 is a partial view of the support structure in one embodiment of the invention.

Turning now to FIG. 7, the lower or second end of the support structure 20 will be described in further detail. Referring again to FIG. 2, the second end of the support structure is located near or at the second end 12 of the entire bag filter 10 in the mounted position. Here, an annular bottom element 29 is connected to every other of the longitudinally extending elements, i.e. to tubular pipe elements 22, 24 and 26. The remaining longitudinally extending elements, i.e. tubular pipe elements 21, 23 and 25, are connected to a connecting device 30 adapted to receive a valve (not shown in detail). As will be described in further detail below, such a valve is adapted to be activated and/or deactivated by control means in the longitudinally extending tubular pipe elements 21, 23 and/or 25. The operative position of the valve may be inspected through a communication port at the second end of the support structure, such a communication port being provided in at least one of said longitudinally extending elements 21-26. As will be described in further detail below, the communication port is furthermore adapted to supply a cleaning liquid, a cleaning gas and/or a drying gas to the interior of the filter bag. Alternatively, or additionally, the communication port may include further means for measuring and/or sensing other parameters.

Figure 8:
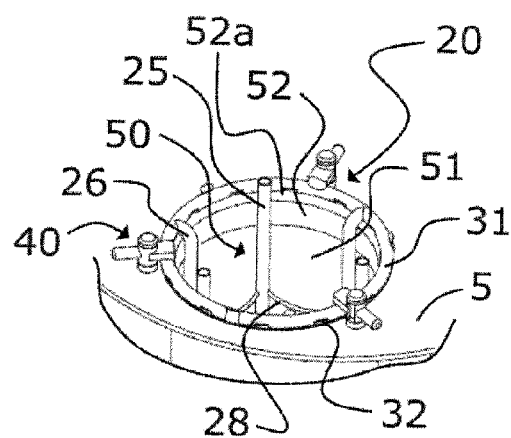
FIG. 8 is a further partial view of the support structure of FIG. 7.

Referring now to FIG. 8, the support structure 20 comprises an annular top element 31 at the first or top end, the top end being located at or near the top end 11 of the entire bag filter 10 in the mounted position as shown in FIG. 2. The top element 31 is connected to the plurality of longitudinally extending tubular pipe elements 21-26 and, in the position shown in FIG. 8, to the suspension plate 5, the suspension plate 5 forming part of a separate filter unit or being integrated into processing equipment. The tubular pipe elements 21, 23 and 25 connected at the lower end to the connection device 30 are connected to the annular top element 31 at a portion of their respective outwards facing periphery, whereas the tubular pipe elements 22, 24 and 26 connected at the lower end to the annular bottom element 29 are connected to the annular top element 31 at their respective end portion. Hence, tubular pipe elements 21, 23 and 25 may be connected to appropriate supply means (not shown) for the supply of pressurized fluid, electrical or optical signals, and/or cleaning and/or drying fluid to control, inspect and/or clean the interior of the filter bag. Furthermore, the annular top element 31 comprises a number of recesses 32 forming drain holes in the side intended to face the suspension plate 5.

Figure 9:
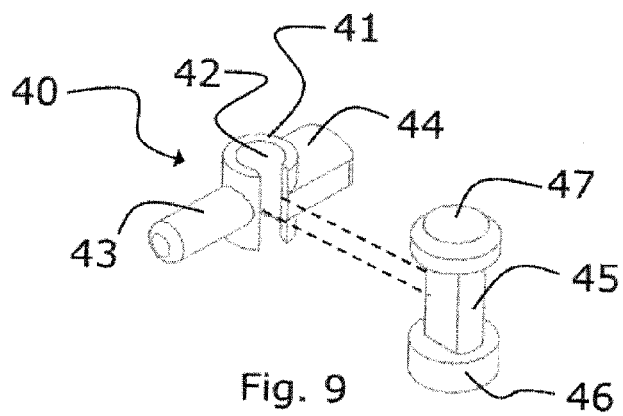
FIG. 9 is an exploded perspective view, on a still larger scale, of a detail of the fastening means for fastening of the support structure in the embodiment of FIGS. 7 and 8.

The annular top element 31 is connected to the suspension plate 5 by means of fastening device 40. As shown in FIG. 9, the fastening device 40 comprises a handle 41 having a keyhole-shaped recess 42. The recess 42 is adapted to be connected to a cross-sectionally rectangular pin 45 mounted on the suspension plate 5 as indicated by the dashed lines of FIG. 9. The rectangular pin 45 is mounted on the suspension plate 5 by means of a mounting portion 46 in any suitable manner, e.g. by welding, and has a retention portion 47 to secure that the handle 41 does not fall off the rectangular pin 45. The width of the opening into the keyhole-shaped recess 42 corresponds in substance to the smaller dimension of the rectangular pin 45 and the internal dimension of the circular portion of the recess 42 corresponds in substance to the larger dimension of the rectangular pin 45. When the recess 42 has been guided over the rectangular pin 45, the handle 41 is turned with respect to the rectangular pin 45 by gripping handling portion 43, possibly by means of an appropriate tool, to obtain a locked position, in which locking portion 44 is brought into abutment with support structure 20. The same operation is carried out on the two other fastening devices to obtain the position shown in FIG. 8, in which the support structure 20 is locked to the suspension plate 5. Unlocking of the support structure 20 with respect to the suspension plate 5 is easily obtained by turning the handle 41 of the respective fastening device 40.

The material of the elements included in the support structure 20 may be any material suitable to the purpose, but may e.g. be stainless steel. The connections between the elements of the support structure, e.g. between the parts 28 of the annular elements 27 and the longitudinally extending tubular pipe elements 21-26, and between the annular bottom and top elements 29, 31 and the tubular pipe elements 21-26, are e.g. carried out by welding. Similarly, the material of the fastening device may also be e.g. stainless steel.

As mentioned in the above, the bag filter comprises a filter bag adapted to be arranged on the outer side of the support structure and in this position to be supported by the support structure, e.g. as described in the above embodiment. In principle, the filter bag may be of any kind suitable to the purpose. Advantageously, however, the filter bag is designed as indicated in Applicant's co-pending application filed on the same day as the present application.

Figure 10:
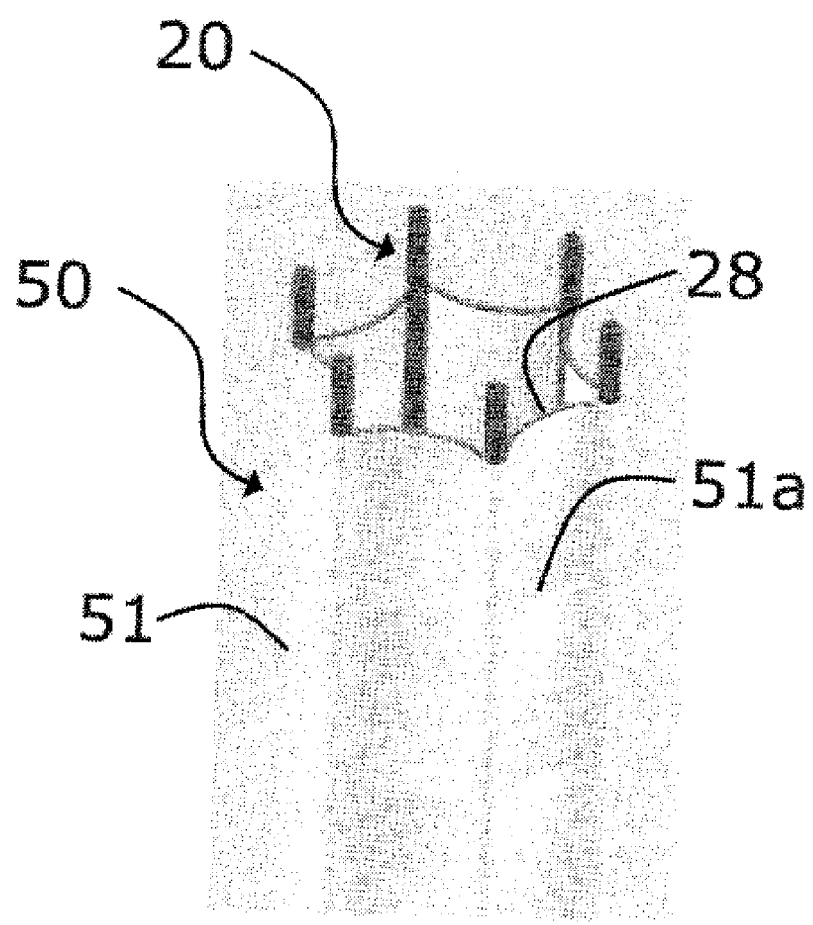
FIG. 10 is a partial perspective view, on a larger scale, corresponding to FIG. 2 and illustrating the support structure in one embodiment interacting with a filter bag.

Referring now in particular to FIGS. 2, 8 and 10, it emerges that each filter bag generally designated 50 has a generally elongated shape and includes a substantially tubular wall 51 made of a suitable filter material. The cross-section of the filter bag 50 may be of any shape suitable to the purpose, for instance oval, polygonal, rectangular, e.g. square. For instance, the filter material may be flexible, synthetic and may possibly include a coating of Teflon® (PTFE). At the first or top end 11 of the bag filter 10 the filter bag 50 has a ring-shaped stiffener 52 connected to the tubular wall 51 of filter material. The ring-shaped stiffener 52 has an upper end portion 52a having a larger diameter than the lower portion of the stiffener 52. In the embodiment shown, the diameter of the upper end portion 52a is slightly larger than the aperture in the suspension plate 5 intended to receive the bag filter. In the position shown in FIG. 8, the upper end portion 52a is clamped between the annular top element 31 of the support structure 20 by means of the fastening devices 40. In turn, the entire filter bag 50 is securely held in place. The ring-shaped stiffener 52 may be formed by any suitable material, e.g. stainless steel. At the second or bottom end 12 of the bag filter 10 has a substantially bowl-shaped stiffener 53, cf. FIG. 2, likewise formed by any material suitable to the purpose, e.g. stainless steel. The bowl-shaped stiffener 53 has a central aperture (not shown) adapted to receive the valve to be connected with the connecting device 30.

During operation of the filter unit 1 process gas carrying product enters the filter unit through the inlet of the filter unit and flows into the area around the bag filters. The gas is filtrated through the tubular walls of the bag filters 10 and flows out through the outlet of the filter unit. As the gas passes the filter walls product carried by the process gas is retained by the bag filters 10. The retained material is partially left on the bag filters and partially drops down and accumulates in the lower section. The accumulated product can then be extracted through the outlet port 4. During filtration a flow of filtrated gas streams vertically up into clean-gas chamber 6. As the filtration proceeds some of the filtered off particles or dust accumulate on the outside of the bag filters, and has to be cleaned away in order to avoid building up of dust cakes. Cleaning is effected during continuous operation of the filter unit by using high pressure reverse pulse gas cleaning.

As shown in FIG. 10, the tubular filter material wall 51 of the filter bag 50 is thus blown against the support structure 20 during operation. It is noted that the tensile load on the tubular wall 51 is notably lower with the support structure 20 according to the invention than it would be with a prior art support structure. This is partly due to the fact that the tubular pipe elements 21-26 have larger diameters than their prior art counterparts, partly to the fact that the annular element parts 28 are formed with a concave shape, seen in the longitudinal direction. As indicated by area 51a in FIG. 10, the material of the tubular wall 51 has a slightly sloping path on each side of the only slightly protruding part 28. In a ring-shaped annular element the slope of the path would be considerably larger, thus increasing the wear and tear on the filter material in the tubular wall 51.

When a filtration procedure is completed and the filter unit needs cleaning, for sanitary reasons or because it is to be used for filtration of another product, a cleaning-in-place (CIP) process is carried out during which the complete interior of the filter unit is washed with a cleaning liquid. Such throughout cleaning of the filter unit carried out in between periods of operation involves cleaning nozzles (not shown) located at least in the clean-gas chamber at the upper outlet side of the bag filters. The cleaning nozzles are supplied with a cleaning liquid or cleaning gas that possibly includes a cleaning agent. It is also possible to supply the cleaning nozzles with gas pulses in combination with the supply of cleaning liquid. In the CIP process, the cleaning liquid or cleaning gas may be introduced into the interior of the filter bag through the above-mentioned communication port at the second end of the support structure and/or from other locations.

During cleaning the cleaning liquid is washed down into the bag filters together with any entrained particles or powder from the clean gas side. The liquid flows through the bag filters and particles or powders accumulate at the bottom of the bag filters, which is drained off by means of the controlled valve at the bottom of each bag filter.

In order to inspect the need for drainage and in order to control the valve, the communication port at the second end of the support structure described in the above may be provided with means for measuring and/or sensing. The inspection may for instance be carried out through tubular pipe element 21. As a result of this inspection, control means located in the tubular pipe elements of the support structure are activated. Such control means may for instance include the introduction of a pressurized fluid into tubular pipe element 23 to activate the valve. When the filter bag 50 has been emptied of its contents to a sufficient degree, the valve is de-activated by the introduction of a pressurized fluid into tubular pipe element 25. As an alternative, the control means may include electrical wiring or optical fibres present in one or more of the tubular pipe elements 21-26.

The invention is not limited to the embodiments shown and described in the above, but various modifications and combinations may be carried out without departing from the scope of the appended claims.

The invention claimed is:

1. A support structure for a filter bag for filtering gas, the filter bag having a general longitudinal direction and including a filter material adapted to be arranged on the outer side of said support structure, said support structure comprising:

a plurality of elements extending in said longitudinal direction from a first end to a second end, wherein the second end is an opposite end to the first end of said support structure, said plurality of longitudinally extending elements including one or more tubular pipe elements, a plurality of substantially annular elements, each annular element being located in a transverse plane perpendicular to the longitudinal direction and connected to the plurality of longitudinally extending elements, and said annular elements being located at a distance from each other in the longitudinal direction, and a connecting device adapted to receive a valve for draining off a cleaning fluid from inside the filter, said connecting device being located at the second end of the support structure and being connected to at least one of said longitudinally extending tubular pipe elements, said valve being adapted to be activated and/or de-activated by control means in said one or more longitudinally extending tubular pipe elements.

2. A support structure according to claim 1, wherein each longitudinally extending element is a tubular pipe element.

3. A support structure according to claim 1, wherein said plurality of substantially annular elements includes elements formed by a number of parts, each part having two ends and extending between adjacent longitudinally extending elements, and each end being connected to a respective longitudinally extending element.

4. A support structure according to claim 3, wherein the general shape of the support structure is cylindrical.

5. A support structure according to claim 3, wherein each of said parts is concave, seen in the longitudinal direction, and the general shape of the support structure is cylindrical with longitudinally extending concavities.

6. A support structure according to claim 1, wherein said plurality of longitudinally extending elements includes between four and ten elements.

7. A support structure according to claim 1, wherein said plurality of substantially annular elements includes tubular pipe elements.

8. A support structure according to claim 1, wherein said control means includes a pressurized fluid.

9. A support structure according to claim 1, wherein said control means includes electrical wiring or optical fibres.

10. A support structure according to claim 1, wherein at least one of said longitudinally extending elements has a communication port at the second end of the support structure.

11. A support structure according to claim 10, wherein said communication port is adapted to supply a cleaning liquid, a cleaning gas and/or a drying gas to the interior of the filter bag.

12. A support structure according to claim 10 wherein said communication port includes means for measuring and/or sensing.

13. A support structure according to claim 1, wherein at least one of said longitudinally extending elements has communication ports along its extension.

14. A support structure according to claim 1, wherein the structure comprises an annular top element at said first end, the top element being connected to said one or more longitudinally extending tubular pipe elements, and wherein the top element is adapted to be connected to a suspension plate by means of a fastening device.

15. A support structure according to claim 14, wherein said annular top element comprises one or more recesses forming drain holes in the side intended to face the suspension plate.

16. A support structure according to claim 14, wherein said fastening device comprises a handle having a keyhole-shaped recess adapted to be connected to a cross-sectionally rectangular pin adapted to be mounted on said suspension plate, said handle being furthermore adapted to be turned with respect to said rectangular pin to obtain a locked position, in which the support structure is connected to said suspension plate.

17. A bag filter comprising a filter bag and a support structure according to claim 1.

18. A method of controlling a filter bag for filtering gas, comprising the steps of:
- providing a support structure with one or more tubular pipe elements,
- connecting one or more of the tubular pipe elements with a connecting device at a second end of the support structure,
- connecting the connecting device with a valve for draining off a cleaning fluid from inside the filter bag, and
- providing at least one of said tubular pipe elements with controls means, and
- controlling said valve through said control means.

19. The method of claim 18, wherein one tubular pipe element is provided with control means for activating the valve and one tubular pipe element with control means for de-activating the valve.

20. The method of claim 18 for controlling, inspecting and/or cleaning the filter bag, wherein one or more of the tubular pipe elements is provided with a communication port at the second end of the support structure.

21. The method of claim 20, wherein the communication port is provided with means for measuring and/or sensing.

22. The method of claim 20, wherein a cleaning liquid, a cleaning gas and/or a drying gas is supplied through the communication port to the interior of the filter bag.

23. The support structure of claim 1, wherein the annular elements of the support structure are positioned substantially along the shape of the filter bag.

24. The support structure of claim 1, wherein the support structure is located on the inside of the filter bag.

* * * * *